(12) United States Patent
Song et al.

(10) Patent No.: US 9,275,310 B2
(45) Date of Patent: *Mar. 1, 2016

(54) EVALUATING IMAGE SIMILARITY

(71) Applicant: Google Inc., Mountain View, CA (US)

(72) Inventors: Yang Song, San Jose, CA (US); Charles J. Rosenberg, Cupertino, CA (US); Andrew Yan-Tak Ng, Palo Alto, CA (US); Bo Chen, Pasadena, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/449,262

(22) Filed: Aug. 1, 2014

(65) Prior Publication Data

US 2015/0170004 A1 Jun. 18, 2015

Related U.S. Application Data

(63) Continuation of application No. 13/430,803, filed on Mar. 27, 2012, now Pat. No. 8,831,358.

(60) Provisional application No. 61/562,083, filed on Nov. 21, 2011.

(51) Int. Cl.
*G06K 9/68* (2006.01)
*G06K 9/62* (2006.01)
*G06K 9/46* (2006.01)

(52) U.S. Cl.
CPC .. *G06K 9/68* (2013.01); *G06K 9/46* (2013.01); *G06K 9/623* (2013.01); *G06K 9/6267* (2013.01)

(58) Field of Classification Search
CPC ..... G06K 9/46; G06K 9/6202; G06K 9/6201; G06K 9/6215
USPC ......................................... 382/218, 195, 190
See application file for complete search history.

(56) References Cited

U.S. PATENT DOCUMENTS

| | | | |
|---|---|---|---|
| 6,643,643 B1 | 11/2003 | Lee | |
| 7,991,232 B2 | 8/2011 | Iwamoto | |
| 8,429,168 B1 * | 4/2013 | Chechik et al. | ............... 707/741 |
| 2006/0074861 A1 | 4/2006 | Wilensky | |
| 2006/0140455 A1 | 6/2006 | Costache | |

* cited by examiner

*Primary Examiner* — Ruiping Li
(74) *Attorney, Agent, or Firm* — Fish & Richardson P.C.

(57) ABSTRACT

Methods, systems, and apparatus, including computer programs encoded on a computer storage medium, for creating an image similarity model. In one aspect, a method includes obtaining feature vectors for images in a set of images, and determining first similarity measures for unlabeled images relative to a reference image. The first similarity measures are independent of first similarity feedback between the unlabeled images and the reference image. The unlabeled images are ranked based on the first similarity measures, and a weighted feature vector is generated based, in part, on the ranking. Second similarity measures are determined, independent of second similarity feedback, for labeled images and a second reference image. The labeled images are ranked based on the second similarity measures. The weighted feature vector is adjusted based, in part, on a comparison of the ranking to a second ranking of the labeled images that is based on the second similarity feedback.

20 Claims, 4 Drawing Sheets

EVALUATING IMAGE SIMILARITY

CROSS-REFERENCE TO RELATED APPLICATIONS

This application is a continuation application of, and claims priority to, U.S. patent application Ser. No. 13/430,803, titled "EVALUATING IMAGE SIMILARITY," filed on Mar. 27, 2012, which claims the benefit under 35 U.S.C. §119(e) of U.S. Patent Application No. 61/562,083, entitled "Learning Low-Level Features from Image Similarity Ranking," filed Nov. 21, 2011. The disclosures of the foregoing applications are incorporated herein by reference in their entirety for all purposes.

BACKGROUND

This specification relates to image processing.

The Internet provides access to a variety of resources such as web pages directed to particular topics, textual content, video content, and images. Many of the resources include images and some search systems provide the ability to search for images by either submitting a textual query or uploading an image that is similar to the images for which the user is searching. For example, a user can upload a picture of a movie star and submit the picture as an image query. Using the image query, the search system can identify online images that are considered similar to the image query and provide a search results page that includes the identified images.

SUMMARY

In general, one innovative aspect of the subject matter described in this specification can be embodied in methods that include the actions of obtaining an image feature vector for each image in a set of images, each image feature vector specifying feature values for an image, each of the feature values being indicative of a visual feature of the image; determining first measures of image similarity, each first measure of image similarity being a measure of image similarity between each of a plurality of unlabeled images from the set and a first reference image, the first measure of image similarity being based on the feature vectors for the unlabeled images and the feature vector for the first reference image, the first measure of image similarity being determined independent of first similarity feedback data indicative of user specified visual similarity between one or more of the unlabeled images and the first reference image; ranking the unlabeled images based on the first measures of image similarity; generating a weighted feature vector based on the feature vectors for the unlabeled images and the ranking; determining second measures of image similarity, each second measure of image similarity being a measure of image similarity between a labeled image from the set and a second reference image, the second measure of image similarity being determined based on the weighted feature vector and the feature vectors for the labeled images, the second measures of image similarity being determined independent of second similarity feedback data indicative of user specified visual similarity between one or more of the labeled images and the second reference image; ranking the labeled images based on the second measures of image similarity; determining that the ranking of the labeled images does not match a second ranking of the labeled images based on the second similarity feedback; and adjusting the weighted feature vector in response to the determination that the ranking does not match the second ranking. Other implementations of this aspect include corresponding systems, apparatus, and computer programs, configured to perform the actions of the methods, encoded on computer storage devices.

These and other implementations can each optionally include one or more of the following features. Methods can include the action of selecting a plurality of first image triplets from the set of images, each first image triplet including a first reference image and two unlabeled images. Determining first measures of similarity can include determining, for each of the first image triplets, a distance between the feature vector for each unlabeled image and the feature vector for the first reference image.

Ranking the unlabeled images can include classifying, for each of the first image triplets, one of the two unlabeled images as being more visually similar to the first reference image, the classification being based on the first measures of image similarities for the first image triplet, the classification being performed independent of the first similarity feedback data. Generating a weighted feature vector comprises determining, based on the feature vectors and the classifications, weight values for a weighted feature vector, each weight value being indicative of an importance of a feature value for determining visual similarity between two images, the determination being performed independent of the first similarity feedback data.

Determining weight values can include the actions of initializing one or more of the weight values in the weighted feature vector to a baseline value; and adjusting, for one or more of the initialized weight values, the baseline value based on the classification of the unlabeled images and the feature vectors for the unlabeled images, the adjustment being performed independent of the first similarity feedback data.

Methods can further include the action of selecting a plurality of second image triplets from the set of images, each second image triplet including the second reference image and two labeled images. Ranking the labeled images can include classifying, for each of the second image triplets, one of the two labeled images as being more visually similar to the second reference image, the classification being based on a function of the weighted feature vector and the image feature vectors for the two labeled images, the classification being performed independent of the second similarity feedback data.

Determining that the ranking of the labeled images does not match the second ranking of the labeled images based on the second similarity feedback can include the actions of determining that the second similarity feedback indicates that a first of the two labeled images is more similar to the second reference image than a second of the two labeled images; and determining that the classification of the two labeled images indicates that the second of the two labeled images is more similar to the second reference image than the first of the two labeled images.

Obtaining an image feature vector for each image in a set of images can include training an autoencoder based on a set of the unlabeled images; identifying hidden activations for the autoencoder; and for each of the images, extracting feature values corresponding to the hidden activations.

Particular implementations of the subject matter described in this specification can be implemented so as to realize one or more of the following advantages. An image similarity model can be trained using images for which user indications of visual similarity have not been received and using images with similarity ranking information.

The details of one or more implementations of the subject matter described in this specification are set forth in the accompanying drawings and the description below. Other

BRIEF DESCRIPTION OF THE DRAWINGS

Like reference numbers and designations in the various drawings indicate like elements.

DETAILED DESCRIPTION

An image similarity model uses feature vectors of images, also referred to as image feature vectors or simply feature vectors, to determine a measure of image similarity between two images. A feature vector for an image specifies one or more feature values that are each indicative of a visual feature—e.g., color, texture, brightness, or edge location—of the image. Generally, the image similarity models will receive the feature vectors for a pair of images as inputs and output a measure of image similarity for the pair of images. This measure of image similarity can be used, for example, to identify images that are responsive to query images or other search queries.

In some implementations, the image similarity model is trained based, in part, on an analysis of feature vectors for unlabeled images—e.g., images for which image similarity information has not been received from users—and a ranking of image similarity between the unlabeled images. For example, assume that a reference image R is selected for an image triplet, and that a distance between the feature vectors of each of the other images A and B and the feature vector for the reference image R is determined. Using this distance information, one of the images, e.g., image A, can be identified as being more similar than the other image, e.g., image B, to the reference image R and images A and B are ranked based on their similarity to the reference image R. Additional image triplets can also be analyzed in a similar fashion to that described above, and the image similarity model is then trained using machine learning techniques based on the feature vectors for the images and the ranking information.

The image similarity model is then used to determine measures of similarity for triplets of labeled images—e.g., images for which image similarity information has been received. The measures of similarity that are output from the model are compared to the image similarity information that has been provided by the users, and the image similarity model can be selectively adjusted based on the comparison. For example, assume that the output of the image similarity model may indicate that image A is more similar than image B to image R. In this example, if the image similarity information from the users, referred to as similarity feedback, indicates that image B is more similar than image A to image R, the image similarity model can be adjusted to increase the likelihood that future outputs of the image similarity model will match the similarity feedback for the triplet. This process is performed on an iterative basis using many different triplets of labeled images to fine tune the model.

Figure 1:
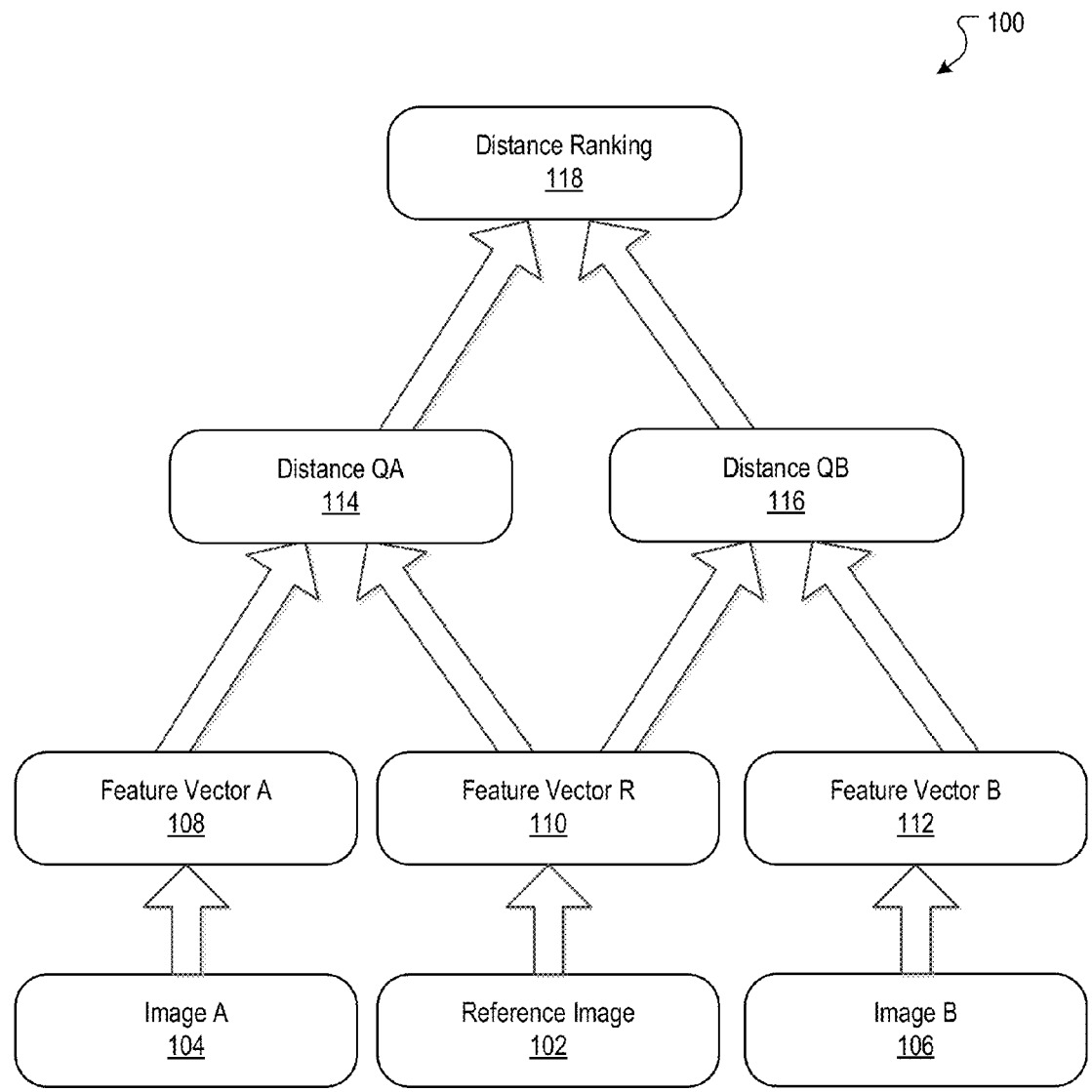
FIG. 1 is a block diagram illustrating an example technique by which image similarity is evaluated.

FIG. 1 is a block diagram 100 illustrating an example technique by which image similarity is evaluated. As illustrated by FIG. 1, each iteration of the example technique can be performed for a different image triplet. Each image triplet is a set of three images, and one of the images is designated as a reference image 102. The reference image 102 is an image to which the other images in the image triplet, e.g., image A 104 and image B 106, will be compared to determine measures of similarity. However, any of the images in the triplet can be selected as the reference image 102.

The measures of similarity will be evaluated, at least in part, based on feature vectors 108, 110, and 112 for the images 102, 104, and 106 in the triplet. For example, distance QA 114 can represent a distance between feature vector A 108 for image A 104 and feature vector R 110 for the reference image 102 can be used as a measure of similarity between image A 104 and the reference image 102. Similarly, distance QB 116 can represent a distance between feature vector B 112 for image B 106 and feature vector R 110 for the reference image 102. The distance can be a Euclidean distance, a Manhattan distance, a cosine distance, a per-feature value distance, or another measure of distance between the feature vectors. Generally, the similarity between two images increases as the distance between the feature vectors decreases.

A distance ranking 118 is a ranked order of image A 104 and image B 106, and the order in which the images are ranked is determined based on the distance QA 114 and the distance QB 116. For example, if the distance QA 114 is smaller than the distance QB 116, image A 104 will be ranked higher than image B 106, such that the ranking of the images represents a relative measure of similarity for each of image A 104 and image B 106 relative to the reference image 102. This measure of similarity can be used to train an image similarity model, as described below.

Figure 2:
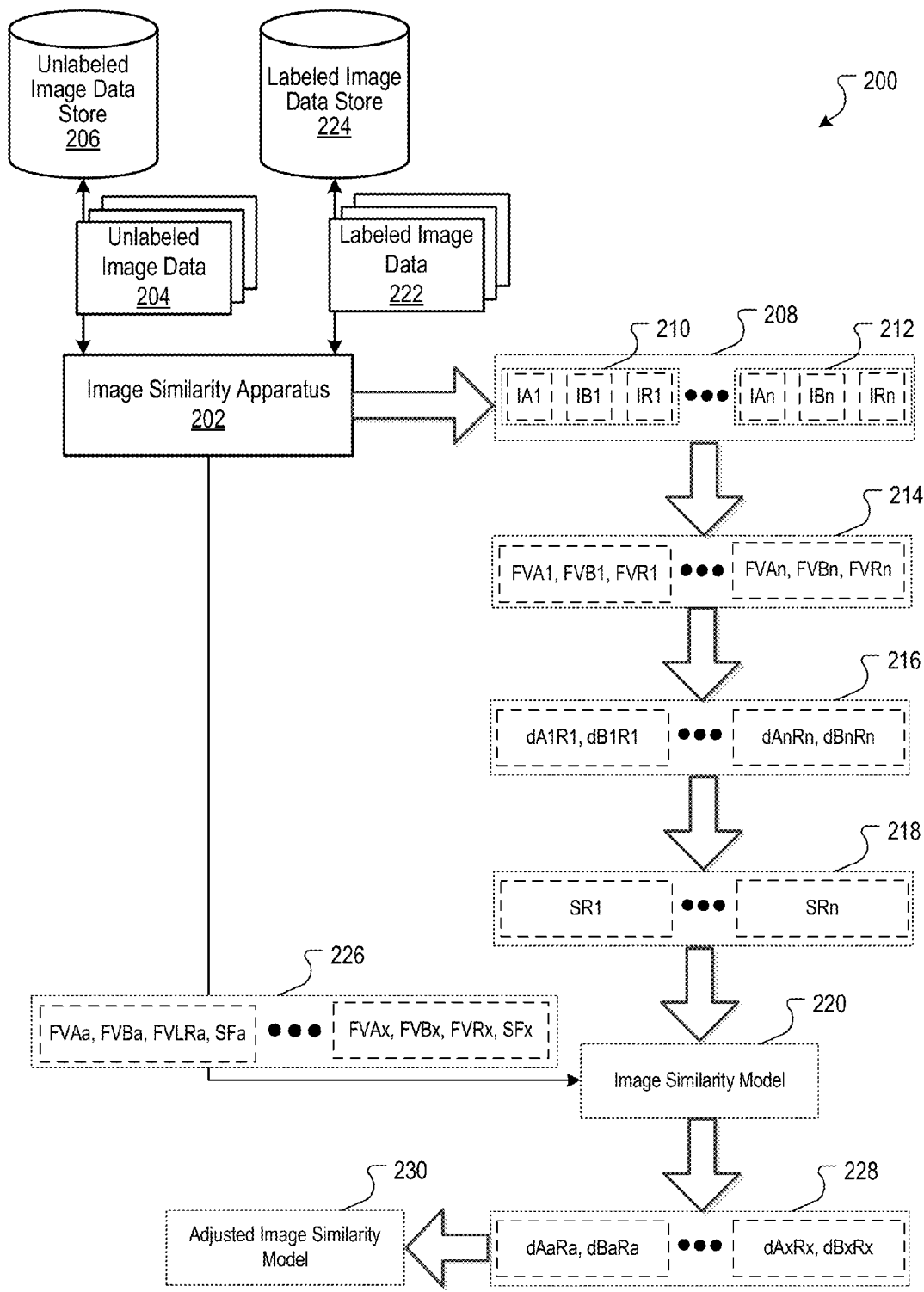
FIG. 2 is a block diagram of an example data flow for training an image similarity model.

FIG. 2 is a block diagram of an example data flow 200 for training an image similarity model. The data flow 200 begins with an image similarity apparatus 202 receiving unlabeled image data 204 from an unlabeled image data store 206, e.g., a data store that stores the unlabeled image data. The unlabeled image data 204 are data representing unlabeled images. The unlabeled image data for a particular image can include all of the data that represent the image or a proper subset of the data that represent the image. As used throughout this document, the term unlabeled image is used to refer to an image with which an image similarity model is trained independent of similarity feedback—i.e., data indicative of user specified measures of visual similarity between two or more of the labeled images—for the image. For example, similarity feedback may not be stored for the unlabeled images, or if similarity feedback has been stored for the unlabeled images, it may not be considered when initially training the image similarity model, but may be subsequently considered to adjust the image similarity model, as described in more detail below.

The image similarity apparatus 202 uses the unlabeled image data 204 to group the unlabeled images into a set of unlabeled image triplets 208. For example, the image similarity apparatus 202 may group images IA1, IB1, and IR1 into unlabeled image triplet 210 and group images IAn, IBn, and IRn into another unlabeled image triplet 212. One of the images in each of the unlabeled image triplets will be designated as the reference image 102, e.g., image IR1, to which each of the other images, e.g., images IA1 and IB1, in the unlabeled image triplet will be evaluated to determine measures of similarity between the reference image 102 and each of the other images.

The image similarity apparatus 202 obtains a set of image feature vectors 214 for the unlabeled image triplets. For example, the image similarity apparatus 202 may obtain the image feature vectors FVA1, FVB1, and FVR1 for the images in unlabeled image triplet 210, and also obtain the image feature vectors FVAn, FVBn, and FVRn for the images in the unlabeled image triplet 212. As described above, the feature vector for each image specifies feature values for the image, and the feature values are indicative of a visual feature of the image. In some implementations, the image features can include color, texture, edges and other characteristics of a portion of the image.

The image similarity apparatus can obtain the feature vectors 208, for example, using an autoencoder that extracts the feature vectors, as described in more detail with reference to FIG. 3. Alternatively, or additionally, the content features can be extracted using feature extraction techniques such as principal component analysis, scale-invariant feature transform, edge detection, corner detection and/or geometric blur. Image features can be extracted, for example, at two or more image scales so that similarities between images at different visual scales can be more accurately determined.

The image similarity apparatus 202 can also obtain some or all of the feature vectors 208 from the unlabeled image data 204 that is received from the unlabeled image data store 206 or from another source. For example, each of the feature vectors 208 may have been previously extracted and stored in the unlabeled image data store 206 with a reference to and/or indexed according to the image from which the feature vector was extracted.

The image similarity apparatus 202 uses the set of feature vectors 214 to obtain a set of distance measures 216. In some implementations, the image similarity apparatus 202 determines a distance measure for each of the unlabeled image triplets. For example, the image similarity apparatus 202 can use the feature vectors FVA1 and FVR1 to compute a distance dA1R1 that represents a distance between the feature vector for image IA1 and the feature vector for reference image IR1. Similarly, the image similarity apparatus 202 can use the feature vectors FVB1 and FVR1 to compute a distance dB1R1 that represents a distance between the feature vector for image IB1 and the feature vector for reference image IR1. In some implementations, the image similarity apparatus 202 determines each distance according to relationship (1).

$$d(IR, Ix) = \sum_i z_i^2 \sqrt{(v_i^{IR} - v_i^{Ix})^2 + k} \quad (1)$$

where, d(IR,Ix) is the distance between the reference image and image Ix;

IR is the reference image for the unlabeled image triplet;

Ix is one of the non-reference images in the unlabeled image triplet;

i is the $i^{th}$ term of the feature vector, where i is an integer;

$z_i$ is a weight factor for $i^{th}$ term;

$v_i$ is a feature value for the $i^{th}$ term; and k is a constant that can be selected to prevent a root value of zero.

Using the set of distance values 216, the image similarity apparatus 202 determines a set of similarity rankings 218. The set of similarity rankings 218 can include a similarity ranking for each unlabeled image triplet in the set of unlabeled image triplets 212. For example, the image similarity apparatus 202 can determine similarity ranking SR1 using the distance values dA1R1 and dB1R1 that were determined for unlabeled image triplet 210. Similarly, the image similarity apparatus 202 can determine similarity ranking SRn using the distance values dAnRn and dBnRn that were determined for unlabeled image triplet 212.

The similarity ranking for each unlabeled image triplet can be determined, for example, based on which of the images in the unlabeled image triplet is more similar to the reference image in the unlabeled image triplet. The image having the lower distance measure relative to the reference image is selected as being more similar to the reference image, and is therefore ranked as being more similar to the reference image. In some implementations, the ranking can be determined based on the classification of one of the images in the unlabeled image triplet as being more similar to the reference image than the other image. For example, assume that the distance dA1R1 between image IA1 and the reference image IR1 was determined to be 0.50, and that the distance dB1R1 between image IB1 and the reference image IR1 was determined to be 0.72. In this example, image IA1 would have a higher similarity ranking than the image IB1. Therefore, image IA1 would be considered more similar than image IB1 to the reference image IR1.

The image similarity apparatus 202 uses the set of similarity rankings 218 to train an image similarity model 220. The image similarity model 220 is trained independent of similarity feedback for the unlabeled images. For example, similarity feedback may not be stored for the unlabeled images or if similarity feedback has been stored for the images, it may not be considered when training the image similarity model 220, but may be subsequently considered to adjust the image similarity model 220.

The image similarity 220 model can be trained, for example, using machine learning techniques that receive the set of feature vectors 214 and the set of similarity rankings 218 and output a weighted feature vector that represents the image similarity model 220. The weighted feature vector includes weight values that correspond to one or more feature values. Each weight value is a value that is indicative of the importance of the corresponding feature value for evaluating image similarity. For example, when a weight value that corresponds to a particular feature value is higher than the weight value that corresponds to another feature value, it is an indication that the particular feature value is more important than the other feature value for evaluating image similarity.

The image similarity apparatus 202 can adjust the similarity model 220 using a set of labeled images and similarity feedback for the labeled images. As used throughout this document a labeled image is an image having similarity feedback that is used to adjust an image similarity model—e.g., an image similarity model that was initially trained using unlabeled images. As discussed above, similarity feedback is data indicative of user specified measures of visual similarity between two or more of the labeled images. In some implementations, the similarity feedback can be explicit feedback provided by users indicating which of a pair of images is more similar to a reference image. For example, a user can be provided with an image triplet that includes a reference image and two other images, and the user can be asked to specify which of the other images is more visually similar to the reference image. The user's response, e.g., the similarity feedback, can be received by the image similarity apparatus 202, and stored in a labeled image data store with a reference to the image triplet that was provided to the user.

Similarity feedback for a particular image triplet can be received from many different users and the results of that similarity feedback can be aggregated to make a determination of which of the images in the image triplet is more similar to the reference image. Similarity feedback data can be received for many different image triplets, such that the image triplets and the similarity feedback can be used to test the accuracy of the image similarity model 220 and/or make adjustments to the image similarity model 220.

In some implementations, the image similarity apparatus 202 obtains labeled image data 222 from the labeled image data store 224. The labeled image data 222 can include, for example, the images for one or more different image triplets for which similarity feedback is available and the labeled image data 222 can include the similarity feedback.

The image similarity apparatus 202 extracts a set of feature vectors from the labeled images in a manner similar to that by which the feature vectors for the unlabeled images were extracted. For example, the image similarity apparatus 202 can extract feature vector FVAa for an image Aa, feature vectors FVBa for image Ba, and FVRa for reference image Ra. The image similarity apparatus 202 inputs the extracted feature vectors and the similarity feedback SFa for the image triplet that includes images Aa, Ba, and Ra into the image similarity model 220. The image similarity apparatus 202 can also input additional feature vectors, e.g., FVAx, FVBx, FVRx, and similarity feedback, e.g., SFx, for other image triplets into the image similarity model 220. The feature vectors and the similarity feedback that are input to the image similarity model 220 are referred to collectively as labeled data 226.

Using the feature vectors from the labeled data 226, the image similarity model 220 determines a set of distances 228 that includes a distance between the reference image for each image triplet and the other images that are included in the image triplet with the reference image. For example, a function of the similarity model 220 and each of the feature vectors can be used to output a value indicative of the relative distances between the reference image and each of the other images in the triplet. The image similarity apparatus 202 uses the distances to rank the images in each of the image triplets based on their respective similarity to, e.g., distance from, the reference image, as described above. In turn, the image similarity apparatus 202 determines if the ranking matches or differs from information provided by the similarity feedback.

For example, assume that the similarity feedback and the ranking both indicate that a same particular image, e.g., image A, in a particular image triplet is more similar to the reference image, e.g., relative to the similarity between image B and the reference image. In this example the ranking matches the information provided by the similarity feedback, such that the image similarity model is considered to have accurately ranked, or classified, the images in the image triplet.

However, when the similarity feedback indicates that image B is the image that is more similar to the reference image, while the ranking indicates that image A is more similar to the reference image, the ranking differs from the information provided by the similarity feedback. Therefore, the image similarity model 220 is considered to have inaccurately ranked, or classified, the images in the image triplet. In response to determining that the ranking differs from the information provided by the similarity feedback, the image similarity apparatus 202 can adjust one or more weighted values to create an adjusted image similarity model 230. The data flow 200 can iteratively repeat to continue to fine tune an image similarity model and to create different image similarity models.

Figure 3:
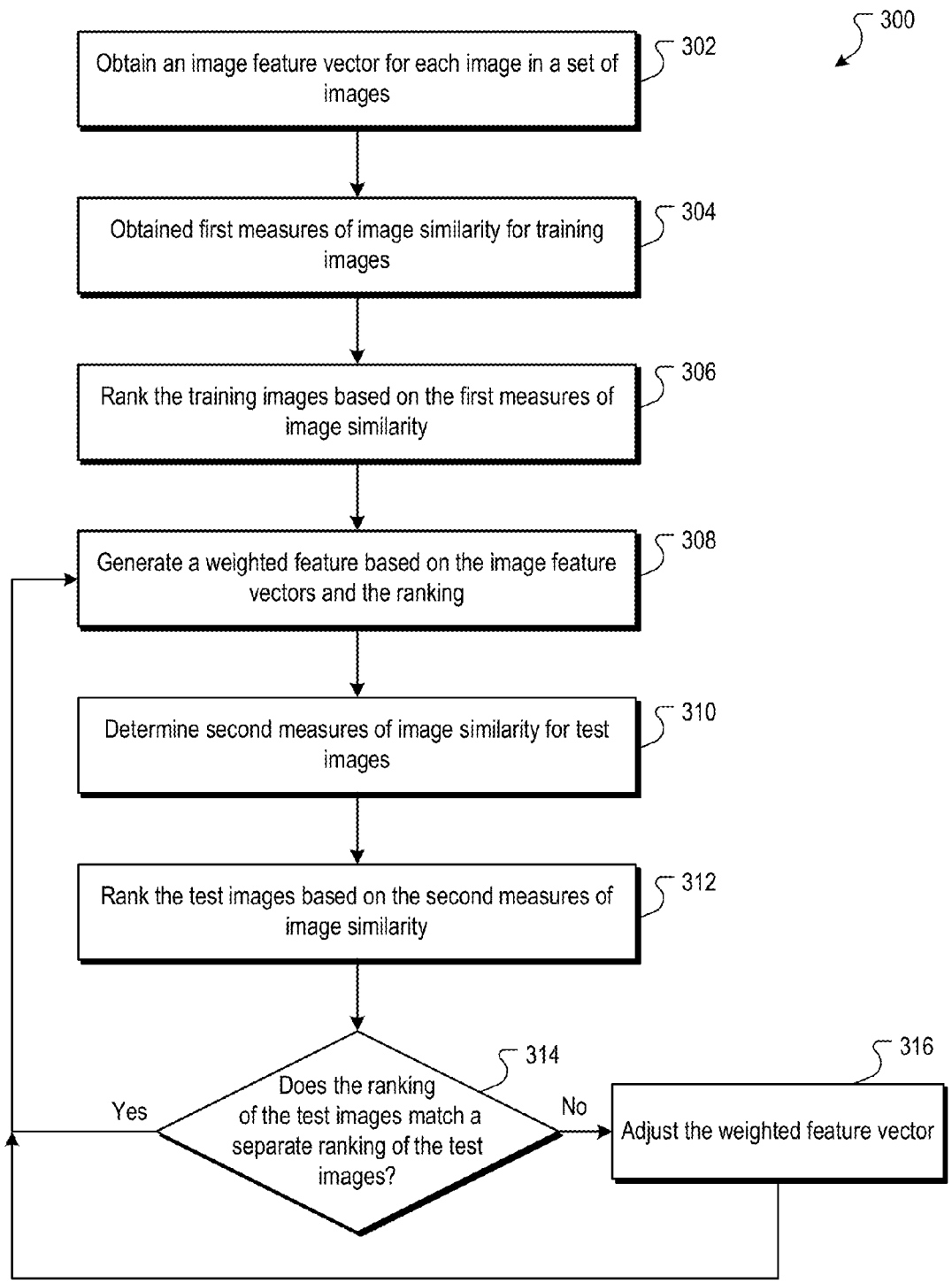
FIG. 3 is a flow chart of an example process for training an image similarity model.

FIG. 3 is a flow chart of an example process 300 for training an image similarity model. The process 300 can be implemented, for example, using the image similarity apparatus 202 of FIG. 2, or another data processing apparatus. The process 300 can also be implemented as instructions stored on computer storage medium such that execution of the instructions by data processing apparatus cause the data processing apparatus to perform the operations of the process 300.

An image feature vector is obtained for each image in a set of images (302). In some implementations, each image feature vector specifies feature values for one of the images. As described above, each of the feature values is indicative of a visual feature of the image.

In some implementations, an autoencoder can be used to obtain the image feature vectors. An autoencoder is a neural network that includes at least 3 layers. For example, an autoencoder can include an input layer that maps pixels of the image, one or more hidden layers that encodes the pixels of the image, and an output layer from which the image can be reconstructed. Once the autoencoder has been trained, the activations of the hidden layers can be used as feature values for evaluating image similarity for an image triplet. An example autoencoder training process is provided below, but other training processes can also be used.

In some implementations, an autoencoder can be trained using any color images that are available irrespective of whether similarity feedback has been received for the images. Each of the images can be "resized" by representing each image with a same fixed dimensional representation. For example, an $N_I \times N_I \times 3$, e.g., 32×32×3, representation of each image can be determined using a resizing algorithm, such as the Lanczos resampling algorithm. In this example, each pixel of the resized images can be converted from a [0 255] representation to a [0 1] representation.

In some implementations, a portion of each of the images is sampled for further analysis, and each of the sampled portions is referred to as a patch. For example, multiple $N_p \times N_p \times 3$, e.g., 5×5×3, patches can be sampled from different various locations of an image. ZCA Whitening can be performed on the patches to reduce the correlations between pixels and to reduce the difference between the variances for the dimensions. The ZCA whitening can be performed, for example, by computing the covariance matrix $\Sigma$ for the patches, and computing the eigenvector decomposition of the covariance matrix $\Sigma$ to obtain a matrix of eigenvectors $U_{pca}$ and a diagonal matrix of eigenvalues $\Lambda$, where $\Sigma = U_{pca} \Lambda U_{pca}^T$.

A ZCA whitening transform matrix can then be constructed according the relationship (2).

$$U_{zca} = U_{pca}(\Lambda + \epsilon)^{\frac{1}{2}} U_{pca}^T \quad (2)$$

where, $U_{zca}$ is the ZCA whitening transform matrix;
$U_{pca}$ is the principal component analysis transform matrix;
$\Lambda$ is the diagonal matrix of eigenvalues;
$\epsilon$ is a smoothing term that reduces noise variance; and
$U_{pca}^T$ is the transpose of the principal component analysis transform matrix.

The ZCA whitening transform matrix can then be applied to each patch, and the output can be used to train the autoencoder. For example, a minFunc process can be performed using a 1-BFGS—Broyden-Fletcher-Goldfarb-Shanno function—and can be performed over many different patches to determine the hidden layers for the autoencoder, which can then be used to extract features of the images in the set.

In some implementations, the autoencoder is applied to unlabeled image triplets that are selected from the set of images. Each unlabeled image triplet includes a reference image and two unlabeled images. Prior to extracting features from the images in an unlabeled image triplet using the autoencoder, each image can be resized to an $N_I \times N_I \times 3$ representation of the image, as discussed above. The hidden layers of the autoencoder are then convolutionally applied to each of the resized images to obtain a response map that is smaller than the unlabeled image triplet. Spatial pooling can also be used to reduce the dimensionality of the feature vectors for the images. For example, either mean pooling or max pooling can be used to summarize each $N_b \times N_b$ block of the response map. The size of the pooled response map will be $N_R = (N_I - N_F + 1)/N_b$. The extracted feature vector for each of the images will be a concatenation of each pooled response map for the image, such that the length of each extracted feature vector will be $N_R \times N_R \times N_h$, where $N_h$ is a length of the vector representing the hidden layer.

First measures of image similarity are determined for unlabeled images (304). In some implementations, each first measure of image similarity is a measure of image similarity between each of a plurality of unlabeled images from the set and a reference image. For example, the first measure of image similarity for a particular image triplet can specify which image in the triplet is more similar to a reference image triplet, as described above with reference to FIG. 2.

The first measure of image similarity can be based on the feature vectors for the reference image in an unlabeled image triplet and the feature vectors for the other two unlabeled images in the unlabeled image triplet. In some implementations, the first measure of image similarity can be based on a distance between the feature vector for reference image and the feature vector for each of the other unlabeled images in the unlabeled image triplet, as described above with reference to FIG. 2. For example, an image having a first feature vector that is closer to the feature vector of the reference image is considered to be more visually similar than another image having a second feature vector that is farther from the feature vector of the reference image than the first feature vector.

In some implementations, the measure of image similarity is determined independent of first similarity feedback that may have been obtained for two or more of the images in the unlabeled image triplet. For example, a measure of image similarity can be determined based solely on the image feature vectors or the images in the unlabeled image triplet even if similarity feedback has been received for at least a pair of the images in the unlabeled image triplet. As described above, the similarity feedback is data indicative of user specified visual similarity between one or more of the unlabeled images and the first reference image.

The unlabeled images are ranked based on the first measures of image similarity (306). In some implementations, the ranking is performed by classifying one of the two unlabeled images as being more visually similar to the reference image. For example, the unlabeled image that is classified as being more visually similar to the reference image can be the unlabeled image in the unlabeled image triplet having the feature vector that is closest—e.g., among images in that unlabeled image triplet—to the feature vector for the reference image.

A weighted feature vector is generated based on the feature vectors for the unlabeled images and the ranking (308). As described above, the weighted feature vector includes a number of different weight values that are each indicative of the importance of a corresponding feature value for determining visual similarity between two images.

In some implementations, the weighted feature vector is generated from an initial weighted vector. The initial weighted vector can be, for example, a vector in which one or more of the weight values has been initialized to a baseline value, e.g., 0.0 or another baseline value. Using machine learning techniques, relationships between particular image feature values and the ranking of the images can be analyzed to adjust the weight values of the initial weighted vector.

For example, the initial weighted vector and the feature vectors for each unlabeled image that was ranked, or classified, based on its similarity to a reference image can be instantiated in an n-dimensional space, and the initial weighted vector can be adjusted to maximize a distance between the weighted vector and each of the image feature vectors for "more similar images" and the image feature vectors for "less similar images." As used herein, a "more similar image" refers to an image in an image triplet that was identified as being more similar to the reference image for the image triplet than the other image in the image triplet. A "less similar image" refers to the other image in the image triplet that was not identified as being more similar to the reference image. The adjustment of the weighted vector can be performed independent of similarity feedback data that may exist for the images.

Second measures of image similarity are determined for labeled images (310). In some implementations, each second measure of image similarity is a measure of image similarity between a labeled image from the set and a reference image. The second measures of image similarity are determined for labeled image triplets that have been selected to include a reference image and two labeled images. For example, the second measure of image similarity for a particular labeled image triplet can specify which labeled image in the triplet is more similar to the reference image for triplet.

The second measure of image similarity can be determined based on the weighted feature vector and the feature vectors for the labeled images in the labeled image triplet that were not designated as the reference image for the labeled image triplet. For example, the output of a function, such as a dot product, of the weighted feature vector and the feature vector for each of the labeled images in the labeled image triplet can be determined. In some implementations, the second measures of image similarity can be determined independent of similarity feedback indicative of user specified visual similarity between one or more of the labeled images and the second reference image.

The labeled images in each labeled image triplet are ranked based on the second measures of image similarity (312). In some implementations, the ranking is performed by classifying, based on the output a function of the weighted feature vector and the feature vectors for the two labeled images, one of the two labeled images as being more visually similar than the other labeled image to the reference image.

A determination is made whether the ranking, or classification, of the labeled images matches a second ranking of the labeled images (314). In some implementations, the second ranking is based on the similarity feedback for the labeled image triplets. For example, the second ranking may specify, based on similarity feedback from multiple users, which of the two labeled images in a particular labeled image triplet is considered more similar to the reference image. This user specified ranking can be compared to the ranking that is based on the second image similarity measures, and if there is a disparity between the two rankings, the rankings can be determined to not match.

For example, assume the similarity feedback for a particular labeled image triplet, e.g., a labeled image triplet that includes images A, B, and R, indicates that the image from the triplet that is most similar to the reference image R is image A, but that the ranking based on the second image similarity measure indicates that the similarity between image B and image R is greater than the similarity between images A and R. In this example, the ranking that was based on the second image similarity measure would not match a separate ranking that was based on the similarity feedback.

The weighted feature vector is adjusted in response to determining that the two rankings of the images don't match, the weighted feature vector is adjusted (316). In some implementations, the weighted feature vector can be adjusted so that the likelihood of the two rankings matches is increased following the adjustment.

For example, the feature weights of the feature vector can be iteratively adjusted, and after each iteration, the output of the function of the adjusted weighted feature vector and the feature vectors of the two labeled images can again be obtained. If the adjustment, e.g., an increase, to one or more feature weights changes the output in such a manner that image A is more likely to be ranked as the more similar image, the one or more feature weights can continue to be adjusted in the same direction, e.g., further increased, in subsequent iterations. Otherwise, the one or more feature weights can be adjusted in an opposite direction, e.g., decreased, and the output can again be analyzed as described above. The iterative adjustment of feature weights can continue for a pre-specified number of iterations or until the amount of change in the output from one iteration to another is less than a threshold value.

Figure 4:
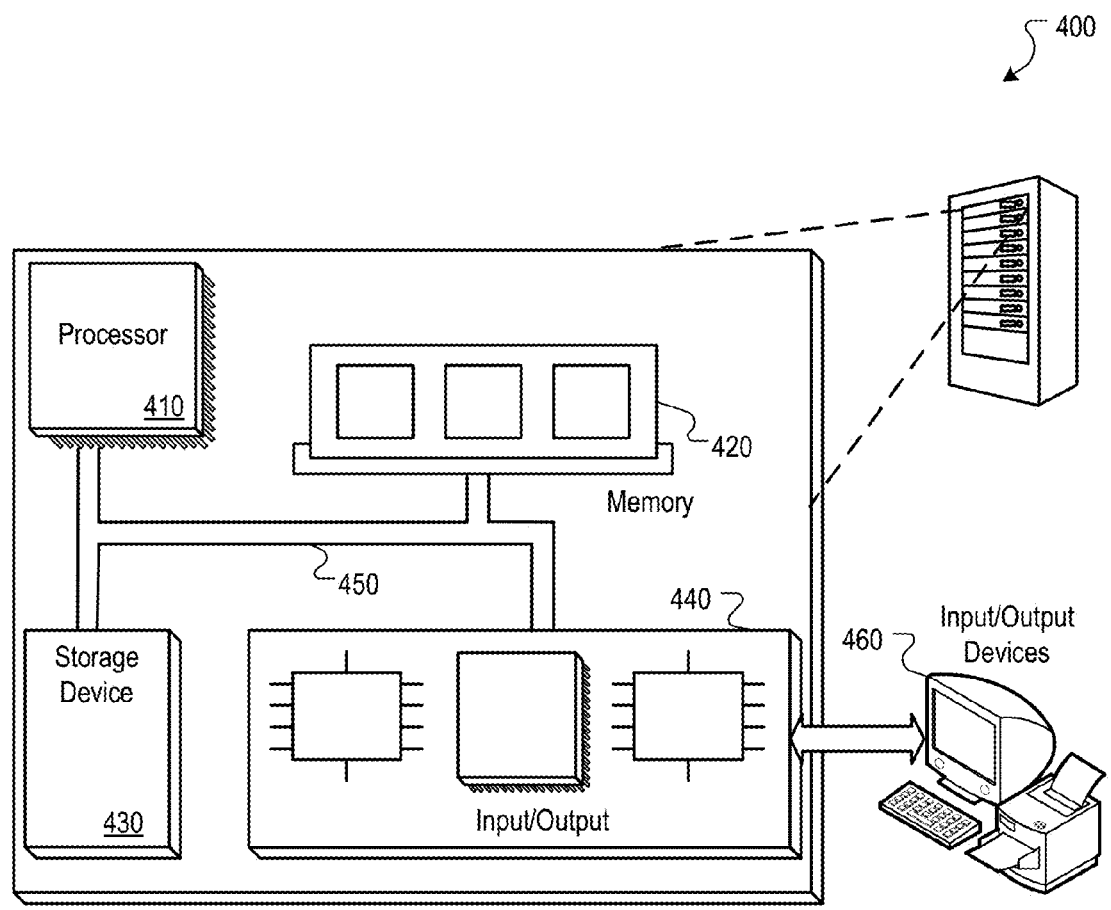
FIG. 4 is block diagram of an example computer system

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices, e.g., a cloud storage device, or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA "field programmable gate array" or an ASIC "application-specific integrated circuit". The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program—also known as a program, software, software application, script, or code—can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data e.g., one or more scripts stored in a markup language document, in a single file dedicated to the program in question, or in multiple coordinated files e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA "field programmable gate array" or an ASIC "application-specific integrated circuit".

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant "PDA", a mobile audio or video player, a game console, a Global Positioning System "GPS" receiver, or a portable storage device e.g., a universal serial bus "USB" flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT "cathode ray tube" or LCD "liquid crystal display" monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network "LAN" and a wide area network "WAN", an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some implementations, a server transmits data—e.g., an HTML page—to a client device, e.g., for purposes of displaying data to and receiving user input from a user interacting with the client device. Data generated at the client device—e.g., a result of the user interaction—can be received from the client device at the server.

While this specification contains many specific implementation details, these should not be construed as limitations on the scope of this document or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    ranking, based on a first measure of visual similarity of each unlabeled image to a first reference image, unlabeled images in a set of images that includes at least two unlabeled images;
    generating a weighted feature vector based on visual features of the unlabeled images and the ranking;
    identifying, from the set of images, a subset of labeled images that includes a second reference image and at least two labeled images;
    determining, by one or more computers and based on the visual features of the at least two labeled images and the weighted feature vector, a second measure of visual similarity between the second reference image and each of the at least two labeled images, the second measure of visual similarity being determined independent of similarity feedback data indicative of user specified visual similarity between the second reference image and each of the at least two labeled images;

ranking, by one or more computers, the at least two labeled images based on the second measure of visual similarity associated with each of the labeled images;

determining, by one or more computers, that the ranking of the labeled images does not match a second ranking of the labeled images based on the similarity feedback data; and adjusting, by one or more computers, the weighted feature vector in response to the determination that the ranking does not match the second ranking and based on the similarity feedback data.

2. The method of claim 1, further comprising:

selecting, from the set of images, a plurality of first image triplets that each include a triplet reference image and two unlabeled images;

determining, for each first image triplet, a distance between feature vectors of the unlabeled images and a feature vector for the triplet reference image; and selecting subsets of unlabeled images based, at least in part, on the distance for each first image triplet.

3. The method of claim 2, wherein ranking the unlabeled images comprises classifying, for each of the first image triplets, one of the two unlabeled images as being more visually similar to the first reference image, the classification being performed independent of the similarity feedback data.

4. The method of claim 3, wherein generating a weighted feature vector comprises determining, based on the feature vectors and the classifications, weight values for a weighted feature vector, each weight value being indicative of an importance of a feature value for determining visual similarity between two images, the determination being performed independent of the similarity feedback data.

5. The method of claim 4, wherein determining weight values comprises:

initializing one or more of the weight values in the weighted feature vector to a baseline value; and adjusting, for one or more of the initialized weight values, the baseline value based on the classification of the unlabeled images and the feature vectors for the unlabeled images, the adjustment being performed independent of the similarity feedback data.

6. The method of claim 2, further comprising selecting a plurality of second image triplets from the set of images, each second image triplet including the second reference image and two labeled images.

7. The method of claim 6, wherein ranking the labeled images comprises classifying, for each of the second image triplets, one of the two labeled images as being more visually similar to the second reference image, the classification being based on a function of the weighted feature vector and the image feature vectors for the two labeled images, the classification being performed independent of the similarity feedback data.

8. A non-transitory computer storage medium encoded with a computer program, the program comprising instructions that when executed by one or more data processing apparatus cause the one or more data processing apparatus to perform operations comprising:

ranking, based on a first measure of visual similarity of each unlabeled image to a first reference image, unlabeled images in a set of images that includes at least two unlabeled images;

generating a weighted feature vector based on visual features of the unlabeled images and the ranking;

identifying, from the set of images, a subset of labeled images that includes a second reference image and at least two labeled images;

determining, based on the visual features of the at least two labeled images and the weighted feature vector, a second measure of visual similarity between the second reference image and each of the at least two labeled images, the second measure of visual similarity being determined independent of similarity feedback data indicative of user specified visual similarity between the second reference image and each of the at least two labeled images;

ranking the at least two labeled images based on the second measure of visual similarity associated with each of the labeled images;

determining that the ranking of the labeled images does not match a second ranking of the labeled images based on the similarity feedback data; and adjusting the weighted feature vector in response to the determination that the ranking does not match the second ranking and based on the similarity feedback data.

9. The computer storage medium of claim 8, wherein the instructions cause the one or more data processing apparatus to perform operations further comprising:

selecting, from the set of images, a plurality of first image triplets that each include a triplet reference image and two unlabeled images;

determining, for each first image triplet, a distance between feature vectors of the unlabeled images and a feature vector for the triplet reference image; and selecting subsets of unlabeled images based, at least in part, on the distance for each first image triplet.

10. The computer storage medium of claim 9, wherein ranking the unlabeled images comprises classifying, for each of the first image triplets, one of the two unlabeled images as being more visually similar to the first reference image, the classification being performed independent of the similarity feedback data.

11. The computer storage medium of claim 10, wherein generating a weighted feature vector comprises determining, based on the feature vectors and the classifications, weight values for a weighted feature vector, each weight value being indicative of an importance of a feature value for determining visual similarity between two images, the determination being performed independent of the similarity feedback data.

12. The computer storage medium of claim 11, wherein determining weight values comprises:

initializing one or more of the weight values in the weighted feature vector to a baseline value; and adjusting, for one or more of the initialized weight values, the baseline value based on the classification of the unlabeled images and the feature vectors for the unlabeled images, the adjustment being performed independent of the similarity feedback data.

13. The computer storage medium of claim 9, wherein the instructions cause the one or more data processing apparatus to perform operations further comprising selecting a plurality of second image triplets from the set of images, each second image triplet including the second reference image and two labeled images.

14. The computer storage medium of claim 13, wherein ranking the labeled images comprises classifying, for each of the second image triplets, one of the two labeled images as being more visually similar to the second reference image, the classification being based on a function of the weighted feature vector and the image feature vectors for the two labeled images, the classification being performed independent of the similarity feedback data.

15. A system comprising:
a data storage device storing, for a set of images, image feature data specifying visual features of images in the set of images; and
one or more computers coupled to the data storage device, the data processing apparatus including instructions that cause the data processing apparatus to perform operations comprising:
ranking, based on a first measure of visual similarity of each unlabeled image to a first reference image, unlabeled images in a set of images that includes at least two unlabeled images;
generating a weighted feature vector based on visual features of the unlabeled images and the ranking;
identifying, from the set of images, a subset of labeled images that includes a second reference image and at least two labeled images;
determining, based on the visual features of the at least two labeled images and the weighted feature vector, a second measure of visual similarity between the second reference image and each of the at least two labeled images, the second measure of visual similarity being determined independent of similarity feedback data indicative of user specified visual similarity between the second reference image and each of the at least two labeled images;
ranking the at least two labeled images based on the second measure of visual similarity associated with each of the labeled images;
determining that the ranking of the labeled images does not match a second ranking of the labeled images based on the similarity feedback data; and
adjusting the weighted feature vector in response to the determination that the ranking does not match the second ranking and based on the similarity feedback data.

16. The system of claim 15, wherein the instructions cause the one or more computers to perform operations further comprising:
selecting, from the set of images, a plurality of first image triplets that each include a triplet reference image and two unlabeled images;
determining, for each first image triplet, a distance between feature vectors of the unlabeled images and a feature vector for the triplet reference image; and
selecting subsets of unlabeled images based, at least in part, on the distance for each first image triplet.

17. The system of claim 16, wherein ranking the unlabeled images comprises classifying, for each of the first image triplets, one of the two unlabeled images as being more visually similar to the first reference image, the classification being performed independent of the similarity feedback data.

18. The system of claim 17, wherein generating a weighted feature vector comprises determining, based on the feature vectors and the classifications, weight values for a weighted feature vector, each weight value being indicative of an importance of a feature value for determining visual similarity between two images, the determination being performed independent of the similarity feedback data.

19. The system of claim 16, wherein the instructions cause the one or more computers to perform operations further comprising selecting a plurality of second image triplets from the set of images, each second image triplet including the second reference image and two labeled images.

20. The system of claim 19, wherein ranking the labeled images comprises classifying, for each of the second image triplets, one of the two labeled images as being more visually similar to the second reference image, the classification being based on a function of the weighted feature vector and the image feature vectors for the two labeled images, the classification being performed independent of the similarity feedback data.

* * * * *